United States Patent
Boyapati et al.

(10) Patent No.: US 11,558,186 B2
(45) Date of Patent: Jan. 17, 2023

(54) SYSTEMS AND METHODS FOR MACHINE LEARNING BASED OPTIMIZATION OF PULSE SEQUENCES FOR QUANTUM KEY DISTRIBUTION

(71) Applicant: Verizon Patent and Licensing Inc., Basking Ridge, NJ (US)

(72) Inventors: Vamsi Krishna Boyapati, Metairie, LA (US); Kishore K. Guntuku, Ashburn, VA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 57 days.

(21) Appl. No.: 17/237,757

(22) Filed: Apr. 22, 2021

(65) Prior Publication Data
US 2022/0345299 A1 Oct. 27, 2022

(51) Int. Cl.
*H04L 9/08* (2006.01)
*H04J 14/02* (2006.01)

(52) U.S. Cl.
CPC ........ *H04L 9/0852* (2013.01); *H04J 14/0278* (2013.01)

(58) Field of Classification Search
CPC .................... H04L 9/0852; H04J 14/0278
See application file for complete search history.

(56) References Cited

U.S. PATENT DOCUMENTS

| | | | | |
|---|---|---|---|---|
| 2006/0045527 A1* | 3/2006 | Maeda | ......... | H04B 10/70 398/79 |
| 2007/0065154 A1* | 3/2007 | Luo | ......... | H04J 14/0282 398/141 |
| 2007/0065155 A1* | 3/2007 | Luo | ......... | H04J 14/0246 398/141 |
| 2010/0074447 A1* | 3/2010 | Luo | ......... | H04B 10/70 398/79 |
| 2011/0280405 A1* | 11/2011 | Habit | ......... | H04B 10/70 380/278 |
| 2012/0002968 A1* | 1/2012 | Luo | ......... | H04L 9/0852 398/140 |
| 2014/0112478 A1* | 4/2014 | Arahira | ......... | H04L 9/0852 380/278 |

* cited by examiner

*Primary Examiner* — Baotran N To

(57) ABSTRACT

A device may include a processor configured to select a quantum key distribution transmission; identify an optical fiber path via which the quantum key distribution transmission is to be performed; determine one or more values for at least one transmission parameter for the identified optical fiber path; and select a pulse script for the optical fiber path based on the determined one or more values for the at least one transmission parameter. The processor may be further configured to perform the quantum key distribution transmission via the identified optical fiber path using the selected pulse script.

20 Claims, 7 Drawing Sheets

SYSTEMS AND METHODS FOR MACHINE LEARNING BASED OPTIMIZATION OF PULSE SEQUENCES FOR QUANTUM KEY DISTRIBUTION

BACKGROUND INFORMATION

Computer devices used by government agencies, financial institutions (e.g., banks or trading houses), or large corporate enterprises may send and receive sensitive information that requires a high degree of security. To securely transfer information, the computer devices may use encryption to protect sensitive information and/or may require authentication or authorization. Reliable distribution of encryption keys may pose various challenges.

DETAILED DESCRIPTION OF EXAMPLE EMBODIMENTS

Figure 1:
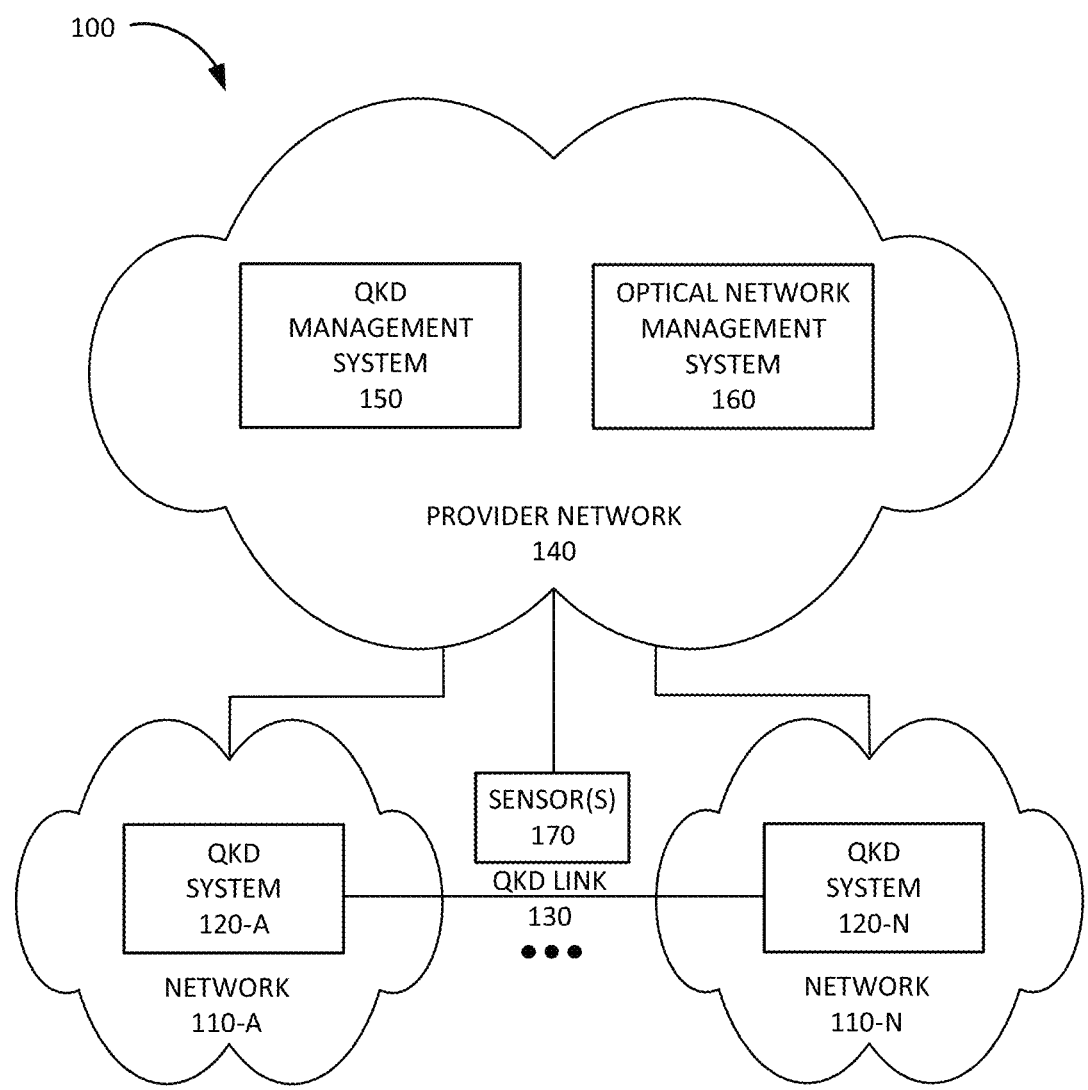
FIG. 1 illustrates an environment according to an implementation described herein.

The following detailed description refers to the accompanying drawings. The same reference numbers in different drawings identify the same or similar elements.

Encrypted communication is essential for many fields, such as finance, defense, the medical field, satellite information system, etc. Security protocols involve cryptographic keys for encrypting messages and/or digital certificates for authenticating users or devices. For example, a Public Key Infrastructure (PKI) system may manage the creation, storage, and distribution of digital certificates and use the digital certificates to verify ownership of public keys. Distribution of digital certificates and/or cryptographic keys for a communication session may require a secure connection.

Cryptographic keys may be distributed via a quantum key distribution (QKD) link. A QKD link may be implemented by sending photons via an optical fiber (or through free space) and using a cryptographic protocol that enables the two parties communicating via the QKD link to prevent eavesdropping either by using quantum indeterminacy to prevent measurement of a particular quantum state or by exchanging photons in an entangled state. Because measuring one photon of an entangled pair of photons affects the other photon in the pair, anyone intercepting either photon alters the entangled pair and reveals that the communication has been compromised. Thus, a QKD link may be used to securely distribute cryptographic keys using quantum bits of information, also referred to as qubits.

However, the distance and quality of transmission of photonic quantum bits may be limited due to a number of different factors along the transmission path. The factors may include environmental factors, such as gravity or light disturbances along the transmission path, factors in the transmission medium (e.g., factors associated with an optical fiber path), such as material impediments along the transmission path, the lengths and/or turns of individual optical fibers along the path, and/or operational factors associated with the transmission, such as the power level and number of wavelength division multiplexing (WDM) channels used along the transmission path. A measure of how accurately a source signal may be reproduced is referred to as fidelity. Thus, the fidelity and longevity of qubits along a QKD channel may be affected by many factors associated with the transmission path.

Systems and methods described herein relate to machine learning based optimization of pulse sequences for QKD. A neural network, and/or another type of machine learning model, may be trained to select a sequence of pulses, referred to as a pulse script, based on a set of transmission parameters associated with a transmission path selected for a QKD transmission. For example, a distance for reliable fidelity for a QKD transmission within a Metro Area Network (MAN) may be limited to 100 miles or less. By selecting a particular pulse sequence for a set of transmission parameters using machine learning, it is possible to increase the QKD transmission distance that satisfies a fidelity requirement, in some examples by up to 30%, though transmission distance may differ overall.

The term "machine learning process," as used herein, may refer to a process performed without requiring user interaction, by using a trained classifier to make a decision, a prediction, and/or an inference for a selection of an optical pulse sequence for transmission. Furthermore, a machine learning process may refer to a process of training the classifier using supervised (e.g., a labeled data set) or unsupervised learning (e.g., an unlabeled data set), using a trained classifier to arrive at a decision, prediction, and/or inference using a particular data set, and/or updating or refining a trained classifier using a particular data set.

A QKD management system may be configured to select a QKD transmission and identifying an optical fiber path via which the QKD transmission is to be made. The QKD management system may determine values for transmission parameters for the identified optical fiber path; select a pulse script for the optical fiber path based on the determined values for the transmission parameters using a machine learning model; and send the QKD transmission, as a set of qubits, via the identified optical fiber path using the selected pulse script. The pulse script may define the amplitude, frequency, and/or duration of a set of optical pulses and/or time intervals between each of the set of optical pulses. The pulse script may be implemented as a set of instructions, in a computer language, for an optical transceiver to generate the set of optical pulses.

The transmission parameters may include environmental parameters, such as, for example, a gravitational disturbance parameter, a light disturbance parameter, a temperature disturbance parameter, a vibrational disturbance parameter, and/or another type of environmental parameter. Values for the environmental parameters associated with the optical fiber transmission path may be obtained, for example, from environmental sensors associated with the optical fiber paths.

Furthermore, the transmission parameters may include fiber parameters, such as, for example, a parameter relating to a material impediment in a fiber along the identified optical fiber path, a number of fiber turns along the identified optical fiber path, a fiber linearity function associated with the identified optical fiber path, a fiber non-linearity function associated with the identified optical fiber path, a path length for the identified optical fiber path, a span number for the identified optical fiber path, a maximum span length for the identified optical fiber path, an average span length for the identified optical fiber path, a number and type of reconfigurable optical add-drop multiplexers (ROADMs), optical transceivers/transponders, and/or optical cross-connects associated with the identified optical fiber path, and/or other types of fiber parameters. Values for the fiber parameters associated with the optical fiber transmission path may be obtained, for example, from an optical network management system, associated with the optical fiber paths, that maintains information relating to the fibers and optical devices for the optical network in which the identified optical fiber path is located.

Moreover, the transmission parameters may include operational parameters associated with the QKD transmission, such as, for example, a frequency for a WDM channel associated with the identified optical fiber path, a power level for a WDM channel associated with the identified optical fiber path, a number of WDM channels associated with the identified optical fiber path, a differential group delay associated with the identified optical fiber path, joint bit-rate and modulation format identification (BR-MFI) information associated with the identified optical fiber path, and/or other types of operational parameters. Values for the operational parameters associated with the optical fiber transmission path may be obtained, for example, from the QKD system that is to perform the QKD transmission.

FIG. 1 is a diagram of an exemplary environment 100 in which the systems and/or methods, described herein, may be implemented. As shown in FIG. 1, environment 100 may include networks 110-A to 110-N (referred to herein collectively as "networks 110" and individually as "network 110") that include QKD systems 120-A to 120-N (referred to herein collectively as "QKD systems 120" and individually as "QKD system 120"), respectively, a QKD link 130, a provider network 140 that includes a QKD management system 150 and an optical network management system 160, and one or more sensors 170.

Network 110 may include a QKD system 120 configured to send and/or receive optical signals via QKD link 130. Network 110 may include a local area network (LAN), a wide area network (WAN), a metropolitan area network (MAN), an optical network, a cable television network, a satellite network, a Radio Area Network (RAN) (e.g., a Fourth Generation (4G) Long Term Evolution (LTE) RAN, a Fifth Generation (5G) New Radio (NR) RAN, etc.), a core wireless network (e.g., a 4G core network, a 5G core network, etc.), an ad hoc network, a telephone network (e.g., the Public Switched Telephone Network (PSTN) or a cellular network), an intranet, or a combination of networks.

QKD system 120 may include an optical transceiver configured to generate a QKD transmission via QKD link 130 based on a set of optical pulses. For example, QKD system 120 may connect to a data center in network 110 and may enable an exchange of cryptographic keys between the data center and another data center in another network 110. As another example, QKD system 120 may connect to a RAN and may enable an exchange of cryptographic keys between a wireless communication device (e.g., a smart phone) and an application server in another network 110. As yet another example, QKD system 120 may connect to a quantum random number generator and may distribute quantum random numbers to other network 110 via QKD link 130. QKD system 120 may provide data relating to operation of QKD link 170 to QKD management system 150.

QKD link 130 may connect two networks 110 using an optical communications link that includes a QKD capability. QKD link 130 may be used to exchange quantum keys between two networks 110. QKD link 30 may include a set of optical fibers and/or optical devices, such a ROADMs, optical transceivers, transponders, and/or amplifiers, and/or optical cross-connects. While QKD link 130 is shown between network 110-A and network 110-N for illustrative purposes, in practice, any two networks 110 may be connected via QKD link 130. Furthermore, any connection between provider network 140 and network 110 may include QKD link 130. In addition, QKD link 130 may facilitate data center redundancy, failover, and backup capabilities. For example, network 110-N may act as a backup to all or a portion of the components of network 110-A, and may use QKD link 130 to exchange data securely.

Provider network 140 may be associated with a provider of communication services that manages QKD systems 120 and QKD links 130. Provider network 140 includes QKD management system 150 and optical network management system 160. QKD management system 150 may include one or more devices, such as computer devices and/or server devices, which manage QKD systems 120. For example, QKD management system 150 may select a pulse script for a QKD transmission to be performed by QKD system 120 based on transmission parameters associated with the QKD transmission. QKD management system 150 may use a trained machine learning model to select a pulse script based on the transmission parameters and provide the selected pulse script to QKD system 120.

Optical network management system 160 may manage an optical network that includes QKD link 130. The optical network may include optical paths and each optical path may include one or more optical fibers, one or more optical connections (e.g., optical cross-connects), and/or one or more optical devices. The optical devices may include ROADMs, optical transceivers, optical transducers, optical amplifiers, and/or other types of optical devices. Optical network management system 160 may maintain information relating to particular optical paths, such as the types, lengths, and/or numbers of optical fibers and/or optical devices associated with each connection, as well as optical properties associated with particular optical fibers and/or optical devices. Optical network management system 60 may provide the fiber information relating to optical fiber paths to QKD management system 160.

Sensor 170 may include an environmental sensor located in proximity (e.g., within a particular distance) of QKD link 130. Sensor 170 may include a temperature sensor, a gravitational sensor, a seismic sensor, a vibrational sensor, a light sensor, a sensor to detect high energy particles, and/or another type of environmental sensor. Sensor 170 may provide sensor data to QKD management system 170.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100. As an example, in some implementations, QKD system 120 may directly select a pulse script using machine learning. As another example, QKD management system 150 may include optical network management system 160 or vice versa. As yet another example, sensors 170 may provide sensor data to a sensor management system (not shown in FIG. 1) that aggregates sensor data for QKD links 130 and the sensor management system may provide the aggregated sensor data to QKD management system 150.

Figure 2:
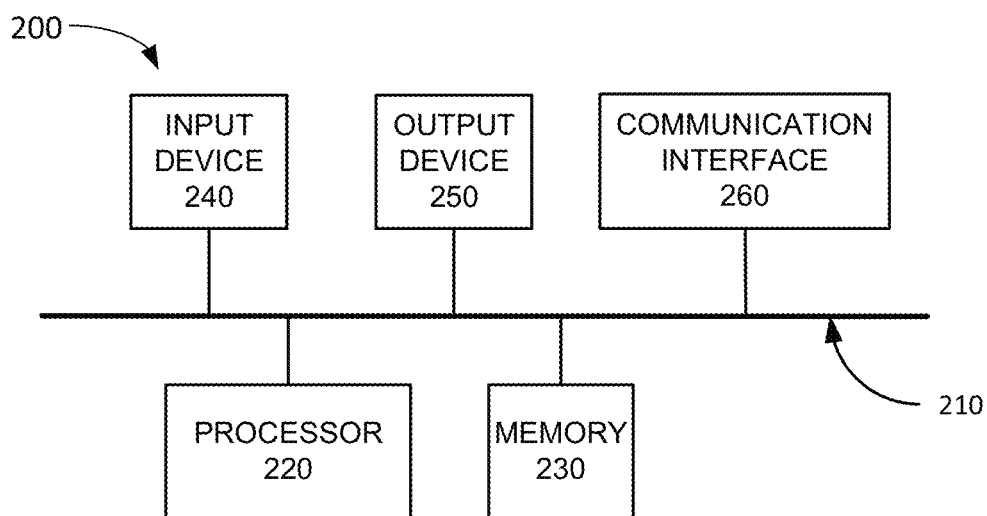
FIG. 2 is a diagram illustrating exemplary components of a device that may be included in a component of FIG. 1 according to an implementation described herein.

FIG. 2 illustrates example components of a device 200 according to an implementation described herein. QKD system 120, QKD management system 150, optical network management system 160, and/or sensor 170 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to one or more antennas/antenna arrays for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to selecting a pulse script for a QKD transmission. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
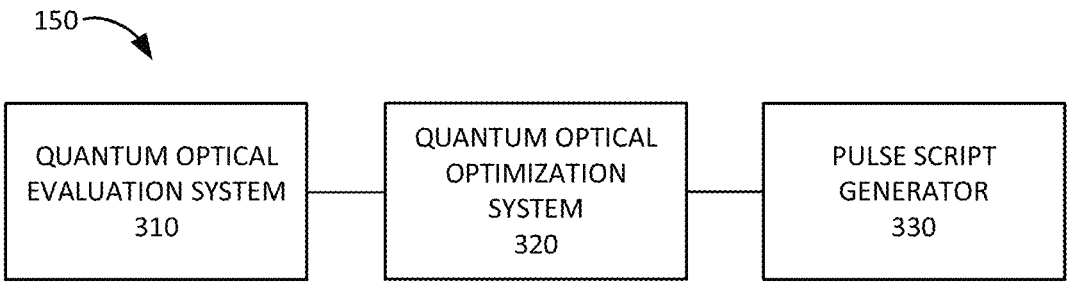
FIG. 3 is a diagram illustrating exemplary components of the quantum key distribution management system of FIG. 1 according to an implementation described herein.

FIG. 3 is a diagram illustrating exemplary components of QKD management system 150. The components of QKD management system 150 may be implemented, for example, via processor 220 executing instructions from memory 230. Alternatively, some or all of the components of QKD management system 150 may be implemented via hardwired circuitry. As shown in FIG. 3, application server 160 may include a quantum optical evaluation system (QOES) 310, a quantum optical optimization system (QOOS) 320, and a pulse script generator 330.

QOES 310 may collect and evaluate data associated with QKD links 130, such as, for example, environmental parameters data, fiber parameters data, and/or operational parameters data, and provide the collected data to QOOS 320. Exemplary components of QOES 310 are described below with reference to FIG. 4. QOOS 320 may select a pulse script to be generated for a QKD transmission based on information collected by QOES 310 using one or more trained machine learning models. Exemplary components of QOOS 320 are described below with reference to FIG. 6. Pulse script generator 330 may generate a pulse script based on a pulse script selected by QOOS 320. For example, pulse script generator 330 may generate a script in a particular computer language that instructs an optical transceiver to generate a set of pulses of a particular amplitude, frequency, and/or duration with specified time intervals the pulses. Pulse script generator 330 may provide the generated pulse script to QKD system 120.

Although FIG. 3 shows exemplary components of QKD management system 150, in other implementations, QKD management system 150 may include fewer components, different components, additional components, or differently arranged components than depicted in FIG. 3. Additionally, or alternatively, one or more components of QKD management system 150 may perform one or more tasks described as being performed by one or more other components of QKD management system 150.

Figure 4:
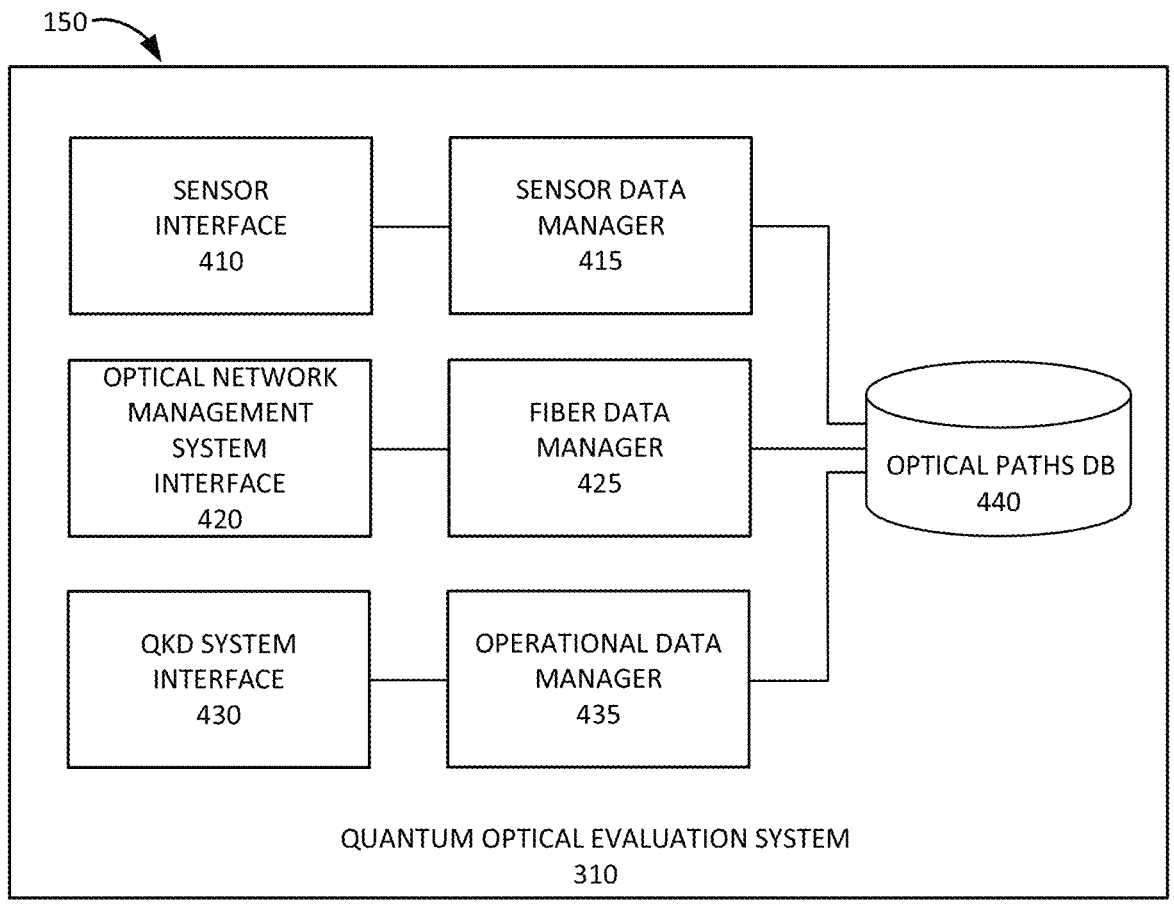
FIG. 4 is a diagram illustrating exemplary components of the quantum optical evaluation system of FIG. 3 according to an implementation described herein.

FIG. 4 is a diagram illustrating exemplary components of QOES 310. The components of QOES 310 may be implemented, for example, via processor 220 executing instructions from memory 230. Alternatively, some or all of the components of QOES 310 may be implemented via hardwired circuitry. As shown in FIG. 4, QOES 310 may include a sensor interface 410, a sensor data manager 415, an optical network management system interface 420, a fiber data manager 425, a QKD system interface 430, an operational data manager 435, and an optical paths DB 440.

Sensor interface 410 may be configured to communicate with sensors 170. For example, sensor interface 410 may receive sensor data from sensors 170 located in proximity to QKD link 130. Sensor data manager 415 may aggregate and organize data received via sensor interface 410. For example, sensor data manager 415 may identify optical paths associated with sensor 170 and store sensor information from sensor 170 in optical paths DB 440 in connection with the identified optical paths. Optical paths DB 440 may store information relating to optical paths such as QKD link 130. Exemplary information that may be stored in optical paths DB 440 is described below with reference to FIG. 5.

Moreover, sensor data manager 415 may determine temporal information associated with the sensor data, such as a time and date when the sensor data was detected, whether an environmental disturbance has been detected based on the sensor data, whether the environmental disturbance is ongoing, has ended, or is of a periodic nature. Sensor data manager 415 may prepare the sensor data into a format usable by QOOS 320, such as, for example, by generating a feature vector to be used as an input into a machine learning model.

Optical network management system interface 420 may be configured to communicate with optical network management system 160. For example, optical network management system interface 420 may receive, from optical network management system 160, fiber parameters data relating to optical fibers and/or optical devices for an optical network that includes QKD link 130. The fiber parameters data may include information such as the types, lengths, and/or numbers of optical fibers and/or optical devices associated with each connection, as well as optical properties associated with particular optical fibers and/or optical devices.

Fiber data manager 425 may aggregate and organize data received via optical network management system interface 420. For example, fiber data manager 425 may identify optical paths associated with the fiber parameters data and store the fiber parameters data in optical paths DB 440 in connection with the identified optical paths. Fiber data manager 425 may prepare the sensor data into a format usable by QOOS 320, such as, for example, by generating a feature vector to be used as an input into a machine learning model.

QKD system interface 430 may be configured to communicate with QKD system 120. For example, QKD system interface 430 may receive, from QKD system 120, operational parameters relating to QKD link 130. The operational parameters may include information such as, for example, information relating to the WDM channels used by QKD link 130. Operational data manager 435 may aggregate and organize data received via QKD system interface 430. For example, operational data manager 435 may identify optical paths associated with the operational parameters data and store the operational parameters data in optical paths DB 440 in connection with the identified optical paths. Operational data manager 435 may prepare the operational parameters data into a format usable by QOOS 320, such as, for example, by generating a feature vector to be used as an input into a machine learning model.

Although FIG. 4 shows exemplary components of QOES 310, in other implementations, QOES 310 may include fewer components, different components, additional components, or differently arranged components than depicted in FIG. 4. Additionally, or alternatively, one or more components of QOES 310 may perform one or more tasks described as being performed by one or more other components of QOES 310.

Figure 5:
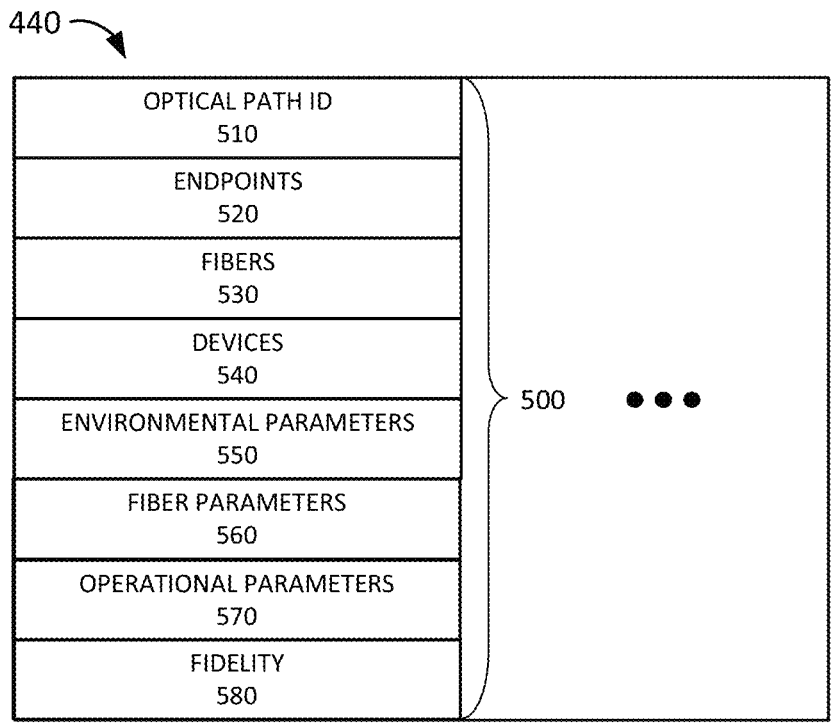
FIG. 5 is a diagram illustrating exemplary components of the optical paths database of FIG. 4 according to an implementation described herein.

FIG. 5 is a diagram illustrating exemplary information stored in optical paths DB 440. As shown in FIG. 5, optical paths DB 440 may include one or more optical path records 500. Each optical record 500 may store information relating to a particular optical path. Optical path record 500 may include an optical path identifier (ID) field 510, an endpoints field 520, a fibers field 530, a devices field 540, an environmental parameters field 550, a fiber parameters field 560, an operational parameters field 570, and a fidelity field 580.

Optical path ID field 510 may store an ID associated with an optical path (e.g., an ID associated with QKD link 130). Endpoints field 520 may identify the endpoints associated with the optical path, such as a first QKD system 120 and a second QKD system 120. Fibers field 530 may identify particular optical fibers (e.g., spans) associated with the optical path. Devices field 540 may identify optical devices associated with the optical path, such as ROADMs, optical transceivers, optical transponders, optical amplifiers, optical cross-connects, and/or other types of optical devices along the optical path.

Environmental parameters field 550 may store information for environmental parameters associated with the optical path, such as whether the optical path is associated with a gravitational disturbance (e.g., density of bedrock in the vicinity of an optical fiber, etc.), a seismic or vibrational disturbance, a temperature disturbance, a light or high-energy particle disturbance, and/or another type of environmental disturbance that may affect the fidelity of transmitted qubits. Moreover, a particular disturbance may be associated with a measured value, such as, for example, a measured temperature.

Fiber parameters field 560 may store information relating to fiber parameter values for the optical path, such as, for example, the total length of the optical path, the span number (e.g., the number of individual optical fiber link, etc.), average span length, maximum span length, numbers and types of turns in the optical path, numbers and types of optical devices along the optical path material impediments (e.g., detected imperfections or impurities in the fiber, etc.), bandwidth distribution, and/or gain spectrum in the fibers and/or devices along the optical path, fiber linearity and/or non-linearity functions for particular fibers and/or devices along the optical path, and/or other types of fiber parameter values.

Operational parameters field 570 may store information relating to operational parameter values for the optical path, such as, for example, a frequency for a WDM channel associated with an optical fiber path, a power level for a WDM channel associated with an optical fiber path, a number of WDM channels associated with an optical fiber path, a differential group delay associated with an optical fiber path, BR-MFI information associated with an optical fiber path, and/or other types of operational parameters.

Fidelity field 580 may store one or more measured fidelity values, and/or additional performance metrics, for the optical fiber path along particular transmission distance for particular pulse scripts as determined by QKD system 120 and/or by optical network management system 160. Fidelity may be measured as, for example, the fraction or percentage of information bits that have been correctly retrieved from a transmission. The performance metrics may include a bit error rate (BER) value, a Q-factor value, a signal-to-noise ratio (SNR) value, and/or other types of performance metrics. The performance metrics values may be used to train and/or update machine learning models managed by QOOS 320.

Although FIG. 5 shows exemplary components of optical paths DB 440, in other implementations, optical paths DB 440 may include fewer components, different components, additional components, or differently arranged components than depicted in FIG. 5.

Figure 6:
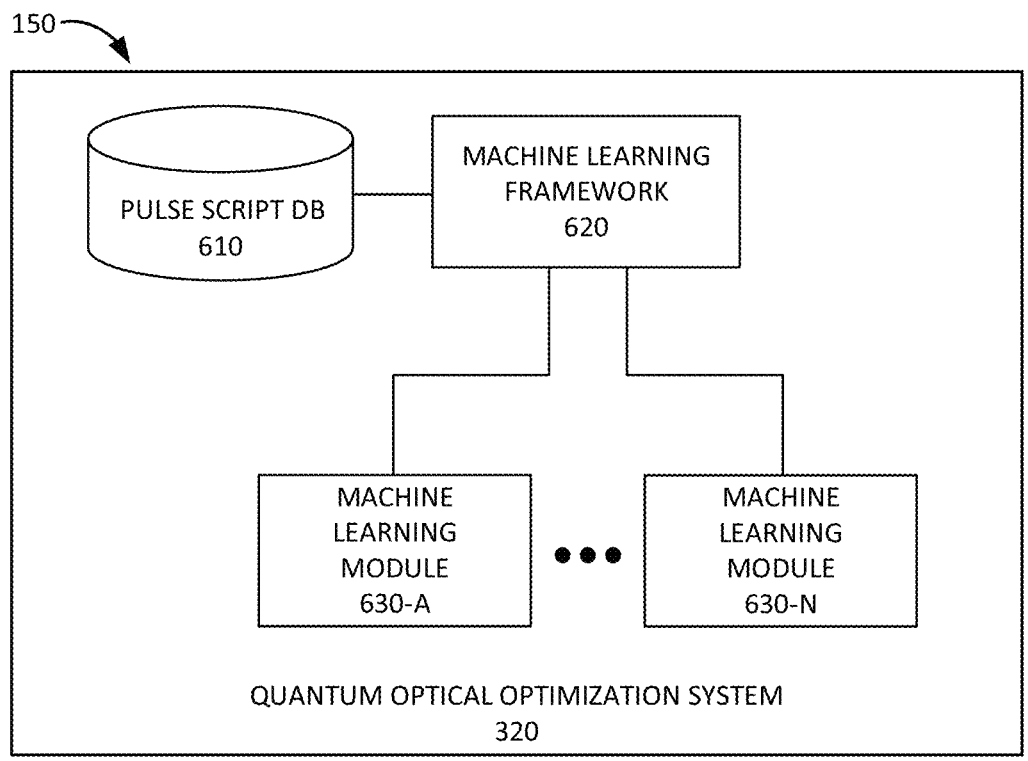
FIG. 6 is a diagram illustrating exemplary components of the quantum optical optimization system of FIG. 3 according to an implementation described herein.

FIG. 6 is a diagram illustrating exemplary components of QOOS 320. The components of QOOS 320 may be implemented, for example, via processor 220 executing instructions from memory 230. Alternatively, some or all of the components of QOOS 320 may be implemented via hard-wired circuitry. As shown in FIG. 6, QOOS 320 may include a pulse script DB 610, a machine learning framework 620, and one or more machine learning models 630-A to 630-N (referred to herein collectively as "machine learning models 630" and individually as "machine learning model 630").

Pulse script DB 610 may store a set of pulse scripts, for a set of pulses to be generated by an optical transmitter, that may be used as output classes by machine learning framework 620. As previously mentioned, a pulse script may define the amplitude, frequency, and/or duration of a set of optical pulses and/or time intervals between each of the set of optical pulses. For example, each pulse script may be represented as an output vector with the features of the output vector corresponding to the amplitude, frequency, and/or duration of individual pulses and/or the time periods between particular pulses. The set of pulse scripts may be updated at particular intervals based on performance parameters measured for particular pulse scripts. Furthermore, in some implementations, a machine learning model may be trained to generate new pulse scripts using a generative neural network, such as, for example, a generative adversarial network (GAN).

Machine learning framework 620 may manage, train, and/or update machine learning models 630 and may select a particular machine learning model 630 for selecting a pulse script for a QKD transmission. A particular machine learning model 630 may be selected based on a desired performance parameter value associated with a QKD transmission and/or an identified optical transmission path, based on available input parameters for the identified optical transmission path, based on a performance metric associated with machine learning model 630, and/or based on another criterion.

Machine learning model 630 may include a machine learning model trained to select a pulse script for a QKD transmission. Machine learning model 630 may include a K-nearest neighbor (KNN) classifier, a naive Bayesian classifier, a logical regression classifier, a neural network classifier, a support vector machine (SVM) classifier, a decision tree classifier, a random forest classifier, a maximum entropy classifier, a kernel density estimation classifier, and/or another type of classifier.

A machine learning model may be trained as a classifier with a set of output classes corresponding to a set of pulse scripts. In some implementations, the output classes may correspond to particular pulse scripts. In other implementation, the output classes may correspond to the amplitude, frequency, and/or duration of individual pulses as well as the time intervals between the individual pulses. Furthermore, a machine learning model may include one or more target performance parameters, such as BER, Q-factor, SNR, and/or another type of performance parameter and the machine learning model may be trained to select a pulse script that maximizes the target performance parameters. Different types of machine learning models may be trained using a different set of input parameters and a different target parameter.

As an example, a KNN and/or a random forest machine learning model may be trained to select a pulse script to optimize BER based on a set of input parameters that includes traffic volume, modulation format, the total length of fiber links in the transmission path, the length of the longest fiber link in the transmission path, and/or the number of links in the transmission path. As another example, a machine learning model based on stochastic gradient descent with polynomial regression may be trained to select a pulse script to optimize BER based on a set of inputs that include optical SNR (OSNR), baud rate, modulation format, forward error correction (FEC) type, and/or optical slot-size. As yet another example, a deep convolutional neural network (CNN) may be trained to select a pulse script to optimize BER based on a set of inputs that include a total length of transmission path, span length, central frequency of WDM channels, the number of optical slots, modulation format, number of erbium-doped fiber amplifiers (EDFAs), the number of fiber links, and a BER associated with the transmission path.

As yet another example, a case-based reasoning neural network machine learning model may be trained to select a pulse script to optimize Q-factor based on a wavelength for a QKD transmission, a total length of the transmission path, a sum of the co-propagating light paths per fiber link, and/or the standard deviation of the total number of co-propagating light paths. As yet another example, a transfer learning neural network machine learning model may be trained to select a pulse script to optimize Q-factor based on channel loading and/or a per-channel output power.

As yet another example, a machine learning model may be used in combination with a model of the physical layer of the transmission path to select a pulse script to optimize SNR based on the length of the transmission path, the link load for the transmission path, the number of crossed EDFAs, the transmission power, and/or a noise value associated with the transmission path.

Although FIG. 6 shows exemplary components of QOOS 320, in other implementations, QOOS 320 may include fewer components, different components, additional components, or differently arranged components than depicted in FIG. 6. Additionally, or alternatively, one or more components of QOOS 320 may perform one or more tasks described as being performed by one or more other components of QOOS 320.

Figure 7:
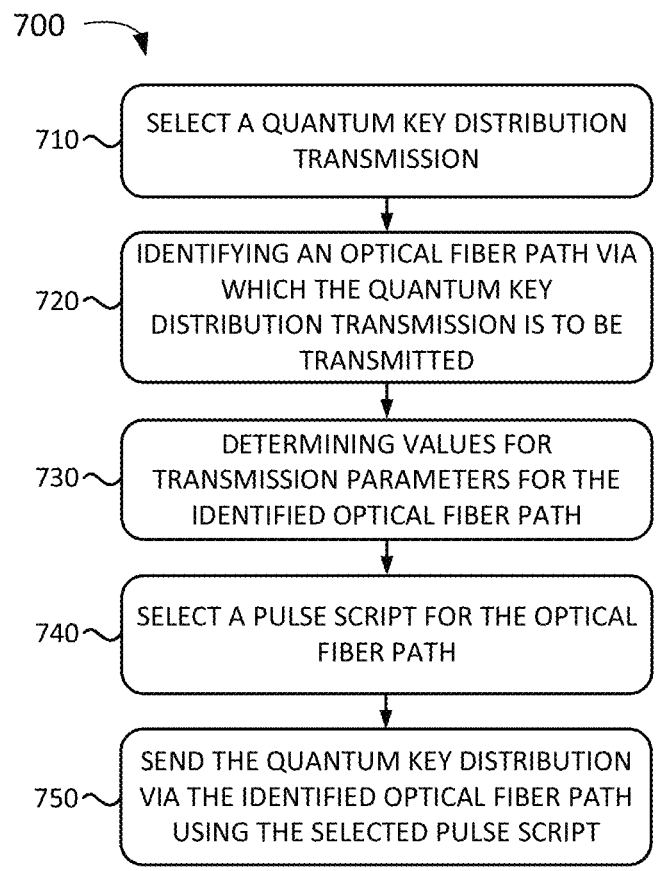
FIG. 7 illustrates a flowchart for processing a quantum key distribution transmission according to an implementation described herein.

FIG. 7 illustrates a flowchart of a process 700 for processing a quantum key distribution transmission according to an implementation described herein. In some implementations, process 700 of FIG. 7 may be performed by QKD management system 150. In other implementations, some or all of process 700 may be performed by another device or a group of devices separate from QKD management system 150.

As shown in FIG. 7, process 700 may include selecting a QKD transmission (block 710) and identifying an optical fiber path via which the QKD transmission is to be made (block 720). For example, QKD management system 150 may receive a request from QKD system 120 to optimize a QKD transmission. The request may include, for example, information identifying a QKD link 130 for the QKD transmission, a time period during which the QKD transmission is to take place, operational parameters for the QKD transmission, an amount of data that is to be transmitted, and/or other types of information that may be used by QKD management system 150 to optimize the QKD transmission by selecting a pulse script.

Process 700 may further include determining values for transmission parameters for the identified optical path (block 730). For example, QOES 310 may access optical paths DB 440, identify an optical path record 500 for the identified optical path, and provide parameter values associated with the optical path to QOOS 320.

Process 700 may further include selecting a pulse script for the optical fiber path (block 740). For example, QOOS 320 may select a particular machine learning model 630 based on the available parameter value, based on a selected performance requirement, and/or based on the performance of various machine learning models and may provide the received parameter values as an input vector to the selected machine learning model 630 to generate a classifier decision that indicates the pulse script class, corresponding to the highest performance value (e.g., longest transmission distance above a particular fidelity value, BER Q-factor, SNR, etc.), which should be selected. Pulse script generator 330 may then select or generate a pulse script based on the output of the selected machine learning model 360. In some implementations, a pulse script may be selected without using a machine learning model. For example, a standard pulse script used to generate qubits may be selected based on a set of requirements and a set of parameter values. Such a selection may be performed using a look-up table, a tree, and/or another type of data structure that relates pulse scripts to parameter values and/or performance requirements.

Process 700 may further include sending the QKD via the identified optical fiber path using the selected pulse script (block 750). For example, QKD management system 150 may provide a pulse script to QKD system 120 and QKD system 120 may use the provided pulse script to send the QKD transmission as qubits along QKD link 130.

Figure 8:
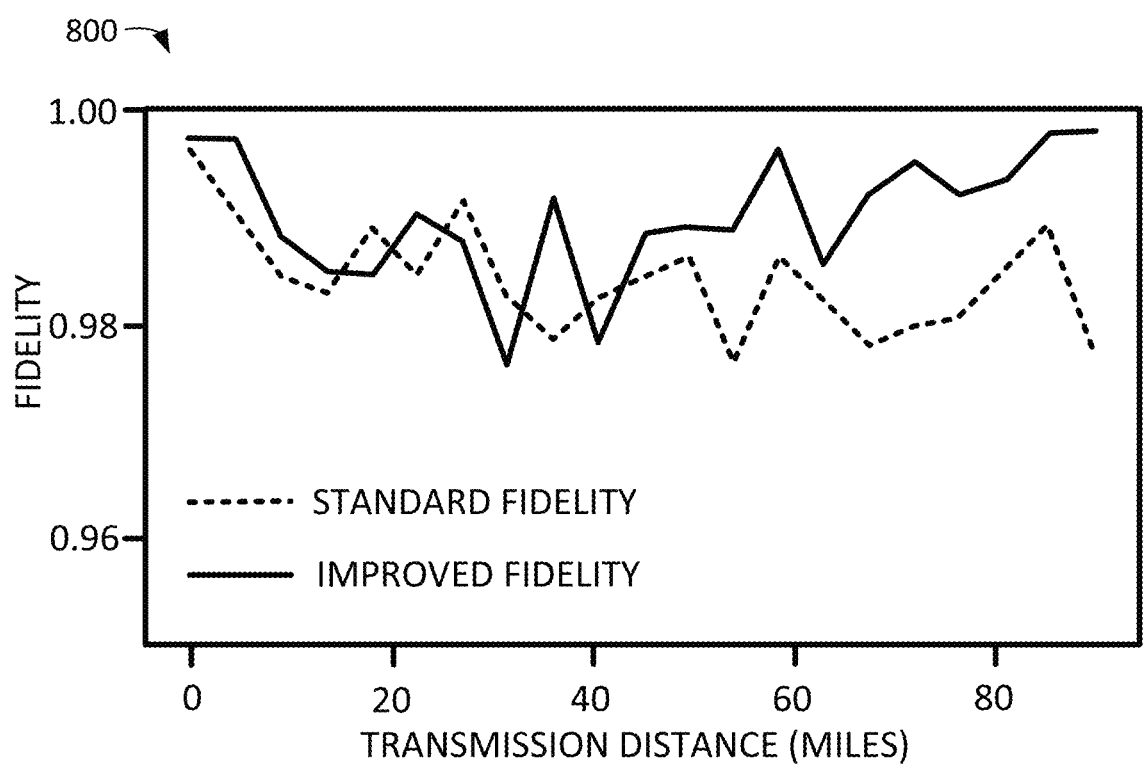
FIG. 8 is a diagram of a plot of fidelity versus transmission distance according to an implementation described herein.

FIG. 8 is a diagram of a plot 800 of fidelity over transmission distance according to an implementation described herein. As shown in plot 800, a standard fidelity of a QKD transmission may decline over transmission distance without optimizing a pulse script for generating optical pulses for the QKD transmission. When an optimized pulse script is selected, the QKD transmission may experience an improved fidelity of the transmission distance in comparison to the standard fidelity.

Figure 9:
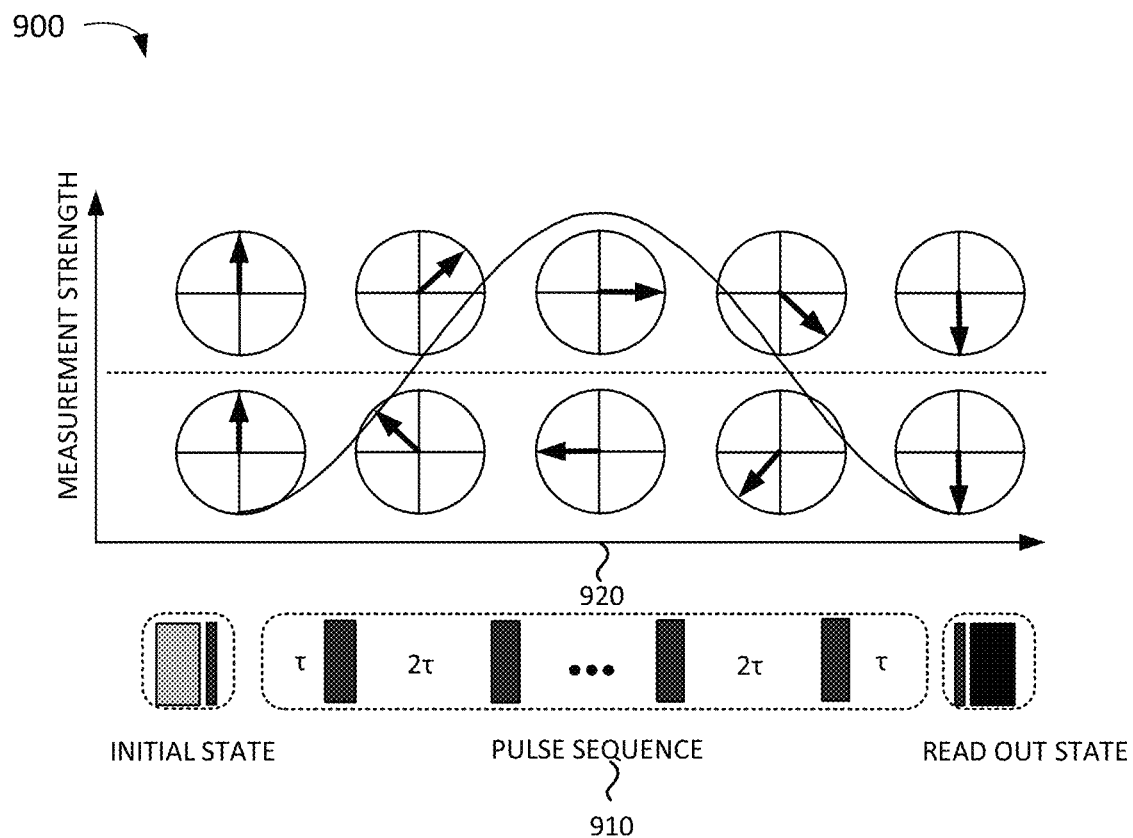
FIG. 9 is a diagram of an exemplary pulse script according to an implementation described herein.

FIG. 9 is a diagram 900 of an exemplary pulse script according to an implementation described herein. As shown in FIG. 9, diagram 900 includes a pulse sequence 910, corresponding to a pulse script, representing a sequence of radio frequency pulses separated by time intervals, where t represents a ratio of the time duration of a pulse and the time period between pulses. The strength of a pulse as a function of amplitude of the wave is shown in plot 920 with corresponding Bloch sphere representations of the effective vector. The effective state of the vector may represent the respective qubit states in plot 920. The series of pulses of pulse sequence 910 may represent an effective read out state of the qubits from an initial state.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 7, the order of the blocks may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    selecting, by a device, a quantum key distribution transmission;
    identifying, by the device, an optical fiber path via which the quantum key distribution transmission is to be performed;
    determining, by the device, one or more values for at least one transmission parameter for the identified optical fiber path;
    selecting, by the device, a pulse script for the optical fiber path based on the determined one or more values for the at least one transmission parameter; and
    performing, by the device, the quantum key distribution transmission via the identified optical fiber path using the selected pulse script.

2. The method of claim 1, wherein the pulse script defines a plurality of optical signal pulses.

3. The method of claim 2, wherein the pulse script further defines time intervals between particular pulses of the plurality of optical pulses.

4. The method of claim 2, wherein the pulse script further defines an amplitude, frequency, or duration of a particular pulse of the plurality of optical pulses.

5. The method of claim 1, wherein the at least one transmission parameter includes an environmental parameter, a fiber parameter, or an operational parameter.

6. The method of claim 5, wherein the at least one transmission parameter includes the environmental parameter, the method further comprising:
    obtaining an environmental parameter value for the environmental parameter from an environmental sensor associated with the identified optical fiber path.

7. The method of claim 5, wherein the at least one transmission parameter includes the fiber parameter, the method further comprising:
    obtaining a fiber parameter value for the fiber parameter from a fiber management system associated with the identified optical fiber path.

8. The method of claim 1, wherein the at least one transmission parameter includes at least two of a gravitational disturbance parameter, a light disturbance parameter, a temperature disturbance parameter, or a vibrational disturbance parameter.

9. The method of claim 1, wherein the at least one transmission parameter includes at least two of a material impediment in a fiber along the identified optical fiber path, a number of fiber turns along the identified optical fiber path, a fiber linearity function associated with the identified optical fiber path, a fiber non-linearity function associated with the identified optical fiber path, a path length for the identified optical fiber path, a span number for the identified optical fiber path, a maximum span length for the identified optical fiber path, or an average span length for the identified optical fiber path.

10. The method of claim 1, wherein the at least one transmission parameter includes at least two of a frequency for a wavelength division multiplexing (WDM) channel associated with the identified optical fiber path, a power level for a WDM channel associated with the identified optical fiber path, a number of WDM channels associated with the identified optical fiber path, or a differential group delay associated with the identified optical fiber path.

11. The method of claim 1, wherein selecting the pulse script for the optical fiber path based on the determined one or more values for the at least one transmission parameter includes:
    selecting the pulse script for the optical fiber path based on the determined one or more values for the at least one transmission parameter using a machine learning model.

12. A device comprising:
    a hardware processor configured to execute instructions to:
        select a quantum key distribution transmission;
        identify an optical fiber path via which the quantum key distribution transmission is to be performed;
        determine one or more values for at least one transmission parameter for the identified optical fiber path;
        select a pulse script for the optical fiber path based on the determined one or more values for the at least one transmission parameter; and
        perform the quantum key distribution transmission via the identified optical fiber path using the selected pulse script.

13. The device of claim 12, wherein the pulse script defines at least one of a set of time intervals between particular pulses of a plurality of optical pulses, or an amplitude, frequency, or duration for particular pulses of the plurality of optical pulses.

14. The device of claim 12, wherein the at least one transmission parameter includes an environmental parameter, and wherein the processor is further configured to:
    obtain an environmental parameter value for the environmental parameter from an environmental sensor associated with the identified optical fiber path.

15. The device of claim 12, wherein the at least one transmission parameter includes a fiber parameter, and wherein the processor is further configured to:
    obtain a fiber parameter value for the fiber parameter from a fiber management system associated with the identified optical fiber path.

16. The device of claim 12, wherein the at least one transmission parameter includes at least two of a gravitational disturbance parameter, a light disturbance parameter, a temperature disturbance parameter, or a vibrational disturbance parameter.

17. The device of claim 12, wherein the at least one transmission parameter includes at least two of a material impediment in a fiber along the identified optical fiber path, a number of fiber turns along the identified optical fiber path, a fiber linearity function associated with the identified optical fiber path, a fiber non-linearity function associated with the identified optical fiber path, a path length for the identified optical fiber path, a span number for the identified optical fiber path, a maximum span length for the identified optical fiber path, or an average span length for the identified optical fiber path.

18. The device of claim 12, wherein the at least one transmission parameter includes at least two of a frequency for a wavelength division multiplexing (WDM) channel associated with the identified optical fiber path, a power level for a WDM channel associated with the identified optical fiber path, a number of WDM channels associated with the identified optical fiber path, or a differential group delay associated with the identified optical fiber path.

19. The device of claim 12, wherein, when select the pulse script for the optical fiber path based on the determined one or more values for the at least one transmission parameter, the processor is further configured to:
    select the pulse script for the optical fiber path based on the determined one or more values for the at least one transmission parameter using a machine learning model.

20. A system comprising:

a first device configured to:
    collect values for at least one transmission parameter associated with a plurality of optical fiber paths; and a second device configured to:
    select a quantum key distribution transmission;
    identify an optical fiber path, of the plurality of fiber paths, via which the quantum key distribution transmission is to be performed;
    obtain, from the first device, one or more values for the at least one transmission parameter value for the at least one transmission parameter for the identified optical fiber path;
    select a pulse script for the optical fiber path based on the determined one or more values for the at least one transmission parameter value; and
    perform the quantum key distribution transmission via the identified optical fiber path using the selected pulse script.

\* \* \* \* \*